(12) United States Patent
Reuvekamp et al.

(10) Patent No.: US 8,470,121 B2
(45) Date of Patent: Jun. 25, 2013

(54) METHOD FOR MUTUALLY ADHERING MOULDED ARTICLES OF VULCANIZED RUBBER AND OF POLYMER

(75) Inventors: Louis-Philippe Antoine Eugène Maria Reuvekamp, Enschede (NL); Gerard Nijman, Losser (NL); Petrus Johannes Van Swaaij, Enschede (NL)

(73) Assignee: Apollo Vredestein B.V., Enschede (NL)

( * ) Notice: Subject to any disclaimer, the term of this patent is extended or adjusted under 35 U.S.C. 154(b) by 806 days.

(21) Appl. No.: 12/528,148

(22) PCT Filed: Feb. 18, 2008

(86) PCT No.: PCT/NL2008/050089
§ 371 (c)(1),
(2), (4) Date: Aug. 21, 2009

(87) PCT Pub. No.: WO2008/127091
PCT Pub. Date: Oct. 23, 2008

(65) Prior Publication Data
US 2010/0032068 A1    Feb. 11, 2010

(30) Foreign Application Priority Data
Feb. 23, 2007  (NL) ..................................... 2000505

(51) Int. Cl.
*B60C 5/00* (2006.01)
*C09J 107/00* (2006.01)
*B32B 25/04* (2006.01)
*B62D 35/00* (2006.01)

(52) U.S. Cl.
USPC ........... 156/325; 156/338; 152/450; 428/339; 296/180.1

(58) Field of Classification Search
USPC .......... 152/450, 325, 331.4, 331.7, 96, 307.1, 152/242, 245; 156/338; 428/339; 296/180.1
See application file for complete search history.

(56) References Cited

U.S. PATENT DOCUMENTS

| 2,905,582 | A | * | 9/1959 | Coleman, Jr. et al. | ........ 156/310 |
| 4,218,349 | A | * | 8/1980 | Minatono et al. | ............. 525/207 |
| 4,552,816 | A | * | 11/1985 | Spahic et al. | ................. 428/420 |
| 4,804,584 | A | * | 2/1989 | Nakashima et al. | ....... 428/424.2 |
| 6,433,031 | B1 | * | 8/2002 | Ramael | .......................... 521/137 |
| 2005/0012359 | A1 | | 1/2005 | Jungert | |
| 2005/0017541 | A1 | | 1/2005 | Jungert | |

FOREIGN PATENT DOCUMENTS

| EP | 1 623 822 A1 | 2/2006 |
| GB | 1 278 258 | 6/1972 |
| WO | 85/02581 | 6/1985 |

OTHER PUBLICATIONS

International Search Report from corresponding International Application No. PCT/NL2008/050089 mailed Mar. 25, 2008.
Written Opinion of the International Searching Authority from corresponding International Application No. PCT/NL2008/050089 mailed Mar. 25, 2008.
Search Report and Written Opinion from corresponding Dutch Patent No. 2000505 dated Feb. 23, 2007.

* cited by examiner

*Primary Examiner* — Michael Orlando
*Assistant Examiner* — Daniel Lee
(74) *Attorney, Agent, or Firm* — Renner, Otto, Boisselle & Sklar, LLP

(57) ABSTRACT

The invention relates to a method for mutually adhering a first moulded article of an at least partially vulcanized rubber polymer and a second moulded article of a polymer. The method comprises at least the steps of providing a first moulded article of a rubber polymer which comprises a compound containing carboxylic acid anhydride; providing a second moulded article of a polymer; providing an adhesive composition comprising at least a polyisocyanate, a polyol and a catalyst; arranging an adhesive layer of the adhesive composition on the surface for adhesion of at least one moulded article; bringing the surfaces for adhesion together under pressure; and polymerizing at least the adhesive layer at a suitable temperature.

15 Claims, 1 Drawing Sheet

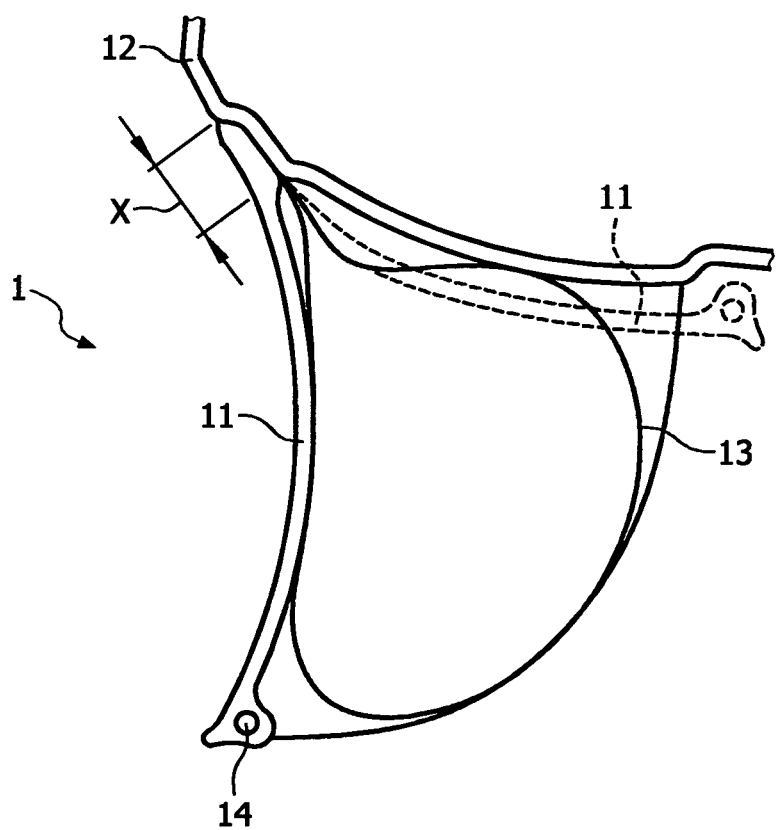

METHOD FOR MUTUALLY ADHERING MOULDED ARTICLES OF VULCANIZED RUBBER AND OF POLYMER

This application is a national phase of International Application No. PCT/NL2008/050089 filed Feb. 18, 2008 and published in the English language, and claims priority to NL 2000505 filed Feb. 23, 2007.

The invention relates to a method for mutually adhering a first moulded article of a rubber polymer and a second moulded article of a polymer. The invention also relates to an adhesive composition with which the first and second moulded article are mutually adhered, and an assembly of mutually adhered moulded articles.

Moulded articles of rubber polymer and other polymers are generally assembled from multiple components. This can for instance be the case for moulded articles of relatively complex form. This is because for such moulded articles it is not always possible to form and vulcanize the moulded article in a mould in one operation, for instance because the shape thereof makes mould undercuts necessary, whereby the moulded article cannot be removed in simple manner from the mould, or because the vulcanization temperature lies above the melting point of the applied polymer.

In the manufacture of an assembled moulded article it is important that the moulded articles from which it is assembled have a good mutual adhesion. In addition, the typical properties of rubber polymers must not be lost when the two moulded articles are mutually connected. Particular properties must be retained, such as a low modulus of elasticity, low hardness, high elongation at break and thereby a high tensile strength, the highly elastic behaviour with a relatively low permanent set, and a relatively high independence from and resistance to temperatures, also in the assembled moulded article.

In a prior art method for manufacturing an assembled moulded article from multiple moulded articles, the constituent moulded articles are first manufactured separately, and subsequently for instance adhered to form the assembled moulded article. Although this has the advantage that a good adhesion between the constituent moulded articles is obtained, the adhesion of a plurality of already manufactured moulded articles results in an assembled moulded article with properties which can differ significantly from that which may be expected from rubber polymers. The adhesive applied in the boundary surface can for instance be more brittle and/or have a hardness and/or modulus of elasticity differing from rubber polymers. In order to obtain good adhesion in the known method the contact surface for adhesion between the two moulded articles must be pretreated. Rubber polymers frequently applied in the rubber industry, such as for instance natural rubber, styrene-butadiene rubber, butadiene rubber and ethylene-propylene-diene rubber, are apolar. The adhesion of second moulded articles of polar polymers to such rubbers is therefore difficult. The pretreatment generally comprises of modifying the rubber polymer with polar groups. A likewise frequently applied method comprises of treating the surface of the rubber polymer with plasma. Both pretreatments have the purpose of obtaining polar groups on the contact surface for adhesion, and of thus improving the adhesion. The known method is however time-consuming, and this means, certainly for plasma treatment, that it is moreover costly.

The present invention has for its object to provide a method according to the preamble, wherein the above stated drawbacks of the known method are at least partially obviated.

This objective is achieved according to the invention by a method for mutually adhering a first moulded article of a rubber polymer and a second moulded article of a polymer, which method comprises at least the steps of (A) providing a first moulded article of a rubber polymer which comprises a compound containing carboxylic acid anhydride; (B) providing a second moulded article of a polymer; (C) providing an adhesive composition comprising at least a polyisocyanate, a diol and a catalyst; (D) arranging an adhesive layer of the adhesive composition on the surface for adhesion of at least one moulded article; (E) bringing the surfaces for adhesion together under pressure; and (F) polymerizing at least the adhesive layer at a suitable temperature. An assembled moulded article is hereby obtained with substantially the same properties as the constituent moulded articles manufactured from rubber polymer. This has particularly great advantages for assembled moulded articles which regularly undergo rubber-elastic deformation during use. An improved adhesion between the constituent moulded articles is moreover obtained due to the invented method. In addition, it has also been found that assembled moulded articles obtained by means of the method display an improved fatigue behaviour compared to the moulded articles obtained in known manner. This is particularly the case for the connection between the constituent moulded articles. An additional advantage of the method according to the invention is that it also allows the connection of moulded articles of a material with a relatively low melting or degradation temperature to the first moulded article of rubber polymer.

The rubber polymer applied in the method according to the invention can be non-vulcanized or at least partially vulcanized. In a preferred embodiment of the method according to the invention the first moulded article is obtained by admixing rubber oligomers containing carboxylic acid anhydride to a rubber, admixing other additives if desired, and at least partially vulcanizing the thus formed rubber composition. Vulcanization can for instance take place by arranging the rubber polymer in for instance a vulcanizing mould in the form of the first moulded article, and bringing this mould to a suitable vulcanization temperature. If desired, the rubber polymer of the first moulded article can be in at least partially vulcanized state. Preferably however, the method according to the invention is characterized in that the rubber polymer is substantially fully vulcanized.

Suitably applicable compounds containing carboxylic acid anhydride are at least monofunctional relative to the polar polymer of the second moulded article. Monofunctional is understood in the context of this application to mean that the compound containing carboxylic acid anhydride will react mainly via the anhydride functionality with the polymer of the second moulded article. This does not preclude the carboxylic acid anhydride-containing compound possibly comprising other reactive groups, although the reactivity of these groups will preferably be lower than the reactivity of the polymer of the second moulded article with the carboxylic acid anhydride group. Compounds suitable for application are for instance saturated aliphatic (di)carboxylic acid anhydrides, such as for instance succinic acid anhydride, glutaric acid anhydride, adipinic acid anhydride and so forth. Also suitable are cycloaliphatic dicarboxylic acid anhydrides, such as for instance cyclohexane-dicarboxylic acid anhydride. Application of cycloaliphatic dicarboxylic acid anhydrides has the additional advantage that discolouration as a result of for instance sunlight is prevented. In addition, dicarboxylic acid anhydride-containing compounds which comprise ethylenic unsaturations are preferably suitable. An example of such an ethylenic unsaturated compound is maleic acid anhydride (MZA). Also particularly suitable are compounds comprising an aromatic unsaturation, such as for instance phtalic acid anhydride and/or trimellitic acid anhydride. The amount of compound containing (di)carboxylic acid anhydride to be applied in the rubber composition and/or in the rubber polymer of the first moulded article can be selected within broad limits. For a given rubber polymer of the first moulded article and polymer of the second moulded article the suitable quantity will generally be determined by determining that quantity which produces the highest level of adhesion between first and second moulded article.

A preferred embodiment of the method according to the invention is characterized in that between 1 and 50% by weight of rubber oligomers containing carboxylic acid anhydride are admixed to the rubber relative to the weight of the rubber, more preferably that between 5 and 25% by weight of rubber oligomers containing carboxylic acid anhydride are admixed to the rubber relative to the weight of the rubber, and most preferably that between 8 and 15% by weight of rubber oligomers containing carboxylic acid anhydride are admixed to the rubber relative to the weight of the rubber.

According to the invention an adhesive layer of an adhesive composition comprising at least a polyisocyanate, a polyalcohol and a catalyst is arranged in step (D) at least in the contact surface for adhesion between the first and the second moulded article. In the step (F) of the method according to the invention described below polyurethanes are thus obtained by means of polyaddition. This relates to the reaction between isocyanates and alcohols and, particularly for the building of macromolecules, the reaction between at least bifunctional starting materials. The invented method is therefore preferably performed with di-isocyanates, tri-isocyanates, and diols, triols and/or polyols. The functionality of the starting material determines whether a thermoplastic (bifunctional) or a thermoset (trifunctional) is obtained as end product.

Polyisocyanates suitable for application in the adhesive composition comprise toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis cyclohexane diisocyanate, 1,4-cyclohexane bis methyl isocyanate, isophorone diisocyanate, 1,5-tetrahydronaphthalene diisocyanate, p-xylene diisocyanate, m-xylene diisocyanate and polymers, such as dimers en trimers of such diisocyanates. This series is given only by way of example, and is by no means intended as limitative.

Polyols, and in particular diols, suitable for application in the adhesive composition comprise aliphatic diols such as for instance ethylene glycol, propane-1,2-diol, propane-1,3-diol, butane-1,2-diol, butane-1,4-diol, butane-1,3-diol, 2,2-dimethyl propanediol-1,3 (=neopentylglycol), hexane-2,5-diol, hexane-1,6-diol, 2,2-bis-(4-hydroxycyclohexyl)-propane (hydrogenated bisphenol-A), 1,4-dimethylolcyclohexane, diethyleneglycol, dipropyleneglycol and 2,2-bis[4-2-hydroxyethoxy)-phenylpropane. It is also possible to apply aromatic polyalcohols and/or relatively small quantities, such as less than about 4% by weight, but preferably less than 2% by weight, of trifunctional alcohols.

In a preferred embodiment of the method according to the invention the adhesive composition of the adhesive layer comprises a short chain diol and a long chain diol. In the context of this application a short chain diol is understood to mean a diol comprising 1 to 50 carbon atoms. In the context of this application a long chain diol is understood to mean a diol comprising at least 51 carbon atoms. Different compounds can be applied as chain extender or flexible chain, provided they have a group reactive with the isocyanate. Examples of suitable reactive groups comprise hydroxyl groups, amines, acids and thiols. Generally speaking, suitable reactive groups comprise a nucleophilic part, which in the context of this application is understood to mean a negative ion or molecule with a non-binding or free electron pair which can react relatively simply with an electrophilic particle, generally as electron-pair donor.

All catalysts known for polyurethane reactions, such as for instance metal complexes, are in principle applicable in the adhesive composition. The quantity of catalyst generally lies between 0.01 and 3% by weight relative to the overall weight of the adhesive composition, although other contents are possible.

There are further advantages when in the invented method the surfaces for adhesion of the constituent moulded articles are pretreated. This can in principle take place in all ways known to the skilled person. It is thus possible to roughen, sand, degrease, provide the surfaces with a primer or other pretreating agent and/or provide the surfaces with radicals. This latter can for instance take place by irradiating the surfaces with radiation of suitable wavelength, for instance UV light, if desired laser radiation. It is also possible to subject the surfaces to an additional plasma treatment, although this is not essential according to the invention.

According to the invented method, an adhesive layer of the adhesive composition is arranged on the surface for adhesion of at least one moulded article, after which the surfaces for adhesion are joined together under pressure, and at least the adhesive layer is polymerized at a suitable temperature. More particularly, a polyaddition reaction is performed on the vulcanized first moulded article with the different, above-stated building blocks. A thermoset is preferably obtained here, for which purpose it is therefore necessary to have a trifunctionality in the system. This can come from the isocyanate and/or from the chain extender, and/or from the polyol. A thermosetting adhesive layer is in this way obtained. At least some of the isocyanate groups will here react with the anhydride of the rubber polymer and thus form a cyclic imide group. In the case the polymer comprises a thermoplastic polyurethane, at least some of the isocyanate groups can in addition also react with the urethane group of the polyurethane, and thus form an allophanate group. By means of the method according to the invention a good adhesion is thus obtained between first and second moulded articles. It is likewise possible according to the invention to perform the polyurethane reaction on the rubber surface during the vulcanization thereof.

The method according to the invention makes it possible, by means of polymerization of a polyurethane adhesive layer, to adhere to a first moulded article of a modified rubber composition a second moulded article of a polymer, and in particular of a thermoplastic polyurethane—in the form of for instance a film—or another polyurethane layer. It is also possible to have a polyurethane layer adhere to only the first moulded article in order to influence the rigidity, deformability and strength. In this application the polyurethane layer does not function as adhesive layer for a second moulded article, but as surface-modifying layer. Suitable applications for the present method include for instance (pneumatic) tyres, and rubber products wherein wear and/or fatigue are an important factor, such as for instance windscreen wipers.

The method according to the invention can be applied to first moulded articles comprising a substantially fully cured rubber polymer. It is however also possible to vulcanize the rubber polymer during arranging of the adhesive layer and/or during polymerizing thereof. It is advantageous in such a case that the rubber composition from which the rubber polymer is formed comprises a peroxide with an initiating temperature which is low such that the vulcanization temperature of the rubber polymer is lower than the degradation temperature of the polymer of the second moulded article. The initiating temperature of a peroxide can be easily determined and is indicated by the supplier of the peroxide. The invention is not limited to the use of specific peroxides, but comprises in principle any peroxide suitable for the relevant rubber composition. The invention also comprises alternatives to peroxides. The peroxides can be chosen such that the vulcanizing of the rubber composition can take place at any temperature. It is advantageous to characterize the method in that the polymerization step F) is performed at a temperature lower than 140° C., preferably lower than 110° C., more preferably lower than 90° C. and most preferably lower than 70° C.

A particularly advantageous preferred embodiment of the method according to the invention is characterized in that the second moulded article comprises a film, and this film is arranged at least partially between two first moulded articles, with the proviso that the temperature in step (F) is lower than the melting or degradation temperature of the film. In this preferred variant the rubber polymer preferably comprises a peroxide with an initiating temperature lower than the melting or degradation temperature of the film, preferably at least 20° C. lower and most preferably at least 50° C. lower. On the basis of this preferred variant it becomes possible in simple and durable manner to connect at least parts of a film to a (first) moulded article of rubber polymer. A possible application herefor comprises actuators which make use of an inflatable bellows of film. Such actuators must of course be airtight and remain so during their lifespan. This also sets high standards for the connection. It has been found that the method according to the invention results in a connection of the inflatable bellows to a substructure which is permanently airtight.

The strength of the adhesive layer arranged between the constituent moulded articles is further improved by a method in which the film is provided with perforations prior to step (F). All films known to the skilled person can in principle be applied in the method according to the invention. It is thus possible for instance to apply metallic films. The film preferably comprises a polymer film, wherein the polymer is chosen from the group of the polyesters, polyethers, polyamides, vinyl polymers, polyolefins, styrene polymers and/or thermoplastic rubbers, in particular thermoplastic polyurethane. Such films are particularly suitable in respect of their properties for connection to rubber polymers. Due to their relatively low melting or degradation temperature however, no suitable method has been available to bring about such a connection. The method according to the invention provides a solution here.

The rubber composition from which the rubber polymer is obtained can be prepared in a manner known to the skilled person, as can the adhesive composition as applied in the method according to the invention. Any known method of mixing polymers, fillers and other additives is in principle suitable for this purpose. It is thus possible to mix the rubber composition, optionally supplemented if desired with additives and/or other polymers, using an internal mixer or Banbury mixer, a single or double-screw extruder apparatus, a blade kneader, a Buss Co-kneader, a roller and the like. Suitable temperatures during mixing are substantially determined by the rheological properties of the relevant rubber polymer.

The rubber polymers preferably applied in the first moulded article can be selected from the known rubbers. In general these rubbers have a glass transition temperature Tg lower than −10° C., although this is not essential. Rubbers suitable for application are for instance chosen from the group of natural rubbers, isoprene rubbers, butadiene rubbers, styrene butadiene copolymer rubbers, acrylonitrile butadiene copolymer rubbers, if desired copolymerized with styrene, butadiene isoprene copolymer rubbers, chloroprene rubbers, butyl and acryl rubbers, and ethylene-propylene copolymers which, if desired, comprise a third copolymerizable diene monomer such as for instance 1,4-hexadiene, dicyclopentadiene, dicyclooctadiene, methylene norbornene, ethylidene norbornene and tetrahydroindene. If desired, the rubber composition also comprises a minor quantity of natural rubber and/or elastomer, which is preferably composed of 1,3-diene compounds such as for instance butadiene and/or isoprene and/or 2,3-dimethyl butadiene. The rubber composition applied in the method preferably comprises an ethylene-propylene rubber, and the applied rubber composition more preferably comprises an ethylene-propylene-diene rubber (EPDM). Mixtures of said rubber polymers are likewise possible.

If desired, additives can be added to the rubber polymer, the adhesive composition and the polymer as these are applied in the method according to the invention. Examples of usual additives are stabilizers, antioxidants, lubricants, fillers, dyes, pigments, flame retardants, conductive fibres and reinforcing fibres. The rubber composition can particularly also comprise an oil as additive. It is also possible to add petroleum plasticizers. Dyes suitable for the rubber composition comprise any type known to the skilled person. It is thus possible to apply organic and/or inorganic dyes which are soluble and/or non-soluble in the rubber polymer. Examples of suitable mineral dyes include metals in powder form, such as for instance powdered aluminium, copper, metal oxides such as for instance silicates, aluminates, titanates, iron oxides and/or hydroxides, in addition to mixtures of oxides of for instance cobalt, aluminium or zinc. White dyes are particularly suitable. Suitable organic colour pigments comprise for instance indanthrones, pyrroles and/or diazo compounds, in addition to organometallic pigments such as for instance phthalocyanines. If desired, the rubber composition can also comprise a coupling agent. Suitable coupling agents comprise silane compounds. Particularly suitable silane compounds comprise di- and tetrasulphides.

The invention also relates to an assembly of mutually adhered first moulded articles of substantially vulcanized rubber polymer and second moulded articles of a preferably polar polymer, which assembly comprises an adhesive layer of an adhesive composition comprising at least a polyisocyanate, a polyol and a catalyst. The assembly can be obtained in accordance with the method according to the invention as described at length above.

It has been found that an assembly of moulded articles obtainable by means of the method according to the invention has an adhesive layer which is relatively thin. The adhesive layer is preferably as thin as possible. In a preferred embodiment of the assembly of moulded articles the adhesive layer has an average thickness of about 0.05 to 0.5 mm, and more preferably an average thickness of about 0.1 to 0.3 mm. Such thin adhesive layers ensure that the rubber-elastic properties are retained in the assembled moulded article, together with a strong adhesion. These advantages become particularly manifest when the assembly also comprises a second moulded article in the form of a film of a thermoplastic polyurethane which is at least partially anchored on and/or between the first moulded articles.

The method according to the invention is particularly suitable for manufacturing a plurality of products, such as tyres in which (thermoplastic) polyurethane components are applied, tyres comprising a basis of polyurethane on which a rubber tread is arranged, rubber sealing products wherein fatigue and/or wear are important factors. Examples of the latter products are for instance windscreen wiper blades, and profiles exposed to a cyclic load. Non-limitative examples of pneumatic tyres comprise pneumatic tyres for passenger cars, cycles, tractors, trailers, trucks, buses, and tyres for motor vehicles.

The method according to the invention is also particularly suitable for manufacturing flexible spoilers, or more generally for flexible bodywork parts of cars or other vehicles. A flexible spoiler is for instance described in the American patent applications US 2005/0012359 and in US 2005/0017541, the content of which is expressly included here in the present application. The spoiler described herein comprises an airflow-conducting element and an operating member therefor. The airflow-conducting element is attached to the bottom of the bumper, is manufactured from a rubber polymer and can be moved in and out by means of the operating member. A resilient connection between airflow-conducting element and bumper holds the spoiler in the moved-in inoperative position. The operating member can for instance take the form of a number of inflatable bellows disposed on the rear side of the spoiler. The inflatable bellows are preferably manufactured from a polymer film, in particular a foil of thermoplastic polyurethane. When the inflatable bellows are inflated, the spoiler moves forward from the moved-in position to the moved-out position. A fibre-reinforced polymer rod provides for lateral guiding of the element.

The present invention also relates to a flexible spoiler for a vehicle, comprising an airflow-conducting element of a rubber polymer, a mounting member for mounting the spoiler on the vehicle and an operating member which can move the airflow-conducting element in and out, wherein the operating member takes the form of a number of inflatable bellows of polymer film disposed on the rear side of the spoiler. According to the invention the operating member, the airflow-conducting element and the mounting member are mutually connected by means of a method at least comprising the steps of providing a rubber composition which comprises a compound containing carboxylic acid anhydride; at least partially vulcanizing the rubber composition in the form of the airflow-conducting element and the mounting member; providing an adhesive composition comprising at least a polyisocyanate, a polyol and a catalyst; arranging an adhesive layer of the adhesive composition on the surface for adhesion of the operating member and/or airflow-conducting element and/or mounting member; bringing the surfaces for adhesion together under pressure; and polymerizing at least the adhesive layer at a suitable temperature, with the proviso that the temperature is lower than the melting or degradation temperature of the film of the operating member.

The invention will now be further elucidated on the basis of the accompanying FIG. 1 and the example below, without however being limited thereto. FIG. 1 here shows a cross-section of an assembly of moulded articles obtained with the method according to the invention.

FIG. 1 more particularly shows a flexible spoiler 1 for a vehicle, of which only the lower part is shown. Spoiler 1 comprises an airflow-conducting element 11 of a rubber polymer, a mounting member 12 for mounting spoiler 1 on the vehicle and an operating member 13 which can move the airflow-conducting element 11 in and out. The moved-out position of airflow-conducting element 11 is shown in FIG. 1 by the continuous line, the moved-in position by the broken line. In the shown variant the operating member 13 takes the form of an inflatable bellows 13 of polymer film disposed on the rear side of spoiler 1. It is also possible to provide a plurality of inflatable bellows 13. When inflatable bellows 13 is inflated, the airflow-conducting element 11 moves forward from the moved-in position into the moved-out position. A fibre-reinforced polymer rod 14 provides for lateral guiding of element 11. At the position of their shared adhesion surface (indicated with "X" in the figure) operating member 13, airflow-conducting element 11 and mounting member 12 are mutually connected according to the invention by means of a particular method which is described in further detail below.

A rubber composition is first prepared in known manner by mixing in a standard kneader for about 5 minutes at an average temperature of about 90° C. The rubber composition comprises 100 parts ethylene-propylene-diene rubber (EPDM, Keltan 514 from the DSM company) and 10 parts of a butadiene rubber oligomer provided with maleic acid anhydride groups. Used as peroxide is a Perkadox BC peroxide with an initiating temperature of about 105° C. The rubber composition further comprises 70 parts soot and about 25 parts of usual additives such as oil, zinc oxide and stearic acid. The rubber composition is vulcanized at about 160° C., wherein two first moulded articles (airflow-conducting element 11 and mounting member 12) are thus formed from the rubber polymer. Operating member 13 comprises a film of thermoplastic polyurethane rubber. Other particularly suitable films comprise films of thermoplastic elastomer and/or thermoplastic polymers. Suitable films preferably have a melting temperature above about 120° C. A thin adhesive layer of an adhesive composition comprising at least polyisocyanate, a diol and a catalyst is applied with an average thickness of about 0.15 mm to the surfaces for adhesion of airflow-conducting element 11 and mounting member 12. Both airflow-conducting element 11 and mounting member 12 are herein situated in a polymerizing mould which is used to vulcanize both first moulded articles. This is of course not essential to the invention, but provides for a simple application of the adhesive layer. Particularly suitable thicknesses of the adhesive layer to be applied lie between about 0.05 and 0.5 mm. The part of operating member 13 for adhesion is then arranged between airflow-conducting element 11 and mounting member 12, both of which are situated in the polymerizing mould. The vulcanizing mould is then closed, wherein a pressure is applied to the surfaces for adhesion (indicated with "X" in the figure) so that the adhesive layer begins to flow and is then polymerized. If desired, polymerization can take place here at an increased temperature, with the proviso that the temperature is preferably lower than the melting or degradation temperature of the film of operating member 13. In the example described here the polymerization temperature amounts to about 105° C., although this may also be lower depending on the film applied. After about 12 minutes the mould is opened and the assembled moulded article is removed from the mould. The assembled moulded article comprises an airflow-conducting element 11, mounting member 12 and operating member 13 well adhered to each other, wherein the operation and more particularly the possibility of rubber-elastic deformation are retained.

The invention claimed is:

1. Method for mutually adhering a first moulded article of a rubber polymer and a second moulded article of a polymer, which method comprises at least the following steps of:
   (A) providing a first moulded article of an at least partially vulcanized rubber polymer which comprises a compound containing carboxylic acid anhydride, the first moulded article having a surface for adhesion;
   (B) providing a second moulded article of a polymer, the second moulded article having a surface for adhesion;
   (C) providing an adhesive composition comprising at least a polyisocyanate, a polyol and a catalyst;

(D) arranging an adhesive layer of the adhesive composition on the surface for adhesion of at least one moulded article;
(E) bringing the surfaces for adhesion together under pressure;
(F) polymerizing at least the adhesive layer at a temperature lower than 140° C.

2. Method as claimed in claim 1, wherein the adhesive composition of the adhesive layer is suitable for entering into a nucleophilic reaction with an isocyanate group.

3. Method as claimed in claim 2, wherein the adhesive composition comprises at least a polyisocyanate, a polyol and a catalyst, the polyol comprising a first polyol with 1 to 50 carbon atoms, and a second polyol with at least 51 carbon atoms.

4. Method as claimed in claim 1, wherein the first moulded article is obtained by admixing rubber oligomers containing carboxylic acid anhydride to a rubber, admixing other additives if desired, and at least partially vulcanizing the thus formed rubber composition.

5. Method as claimed in claim 4, wherein between 1 and 50% by weight of rubber oligomers containing carboxylic acid anhydride are admixed to the rubber relative to the weight of the rubber.

6. Method as claimed in claim 5, wherein between 5 and 25% by weight of rubber oligomers containing carboxylic acid anhydride are admixed to the rubber relative to the weight of the rubber.

7. Method as claimed in claim 1, wherein the first moulded article is a rubber tyre and the second moulded article a film.

8. Method as claimed in claim 7, wherein the film comprises a polymer film, wherein the polymer is chosen from polyesters, polyethers, polyamides, vinyl polymers, polyolefins, styrene polymers and thermoplastic rubbers, and combinations thereof.

9. Method according to claim 8, wherein the thermoplastic rubber comprises a thermoplastic polyurethane.

10. Method as claimed in claim 1, wherein the rubber polymer and/or the rubber composition comprises an ethylene-propylene-diene rubber (EPDM).

11. Method as claimed in claim 1, wherein the rubber polymer and/or the rubber composition comprises additives chosen from cross-linkers, stabilizers, antioxidants, lubricants, fillers, dyes, pigments, flame retardants, conductive fibres, reinforcing fibres, oil and petroleum plasticizers, and combinations thereof.

12. Method as claimed in claim 1, wherein the adhesive layer has an average thickness of 0.05 to 0.5 mm.

13. Method as claimed in claim 1, wherein the first moulded article comprises a pneumatic tyre.

14. Method as claimed in claim 1, wherein the first moulded article comprises the operating member and the mounting member of a flexible spoiler, and the second moulded article comprises the airflow-conducting element of said flexible spoiler, the flexible spoiler comprising an airflow-conducting element of a rubber polymer, a mounting member for mounting the spoiler on the vehicle and an operating member which can move the airflow-conducting element in and out, wherein the operating member takes the form of a number of inflatable bellows of polymer film disposed on the rear side of the spoiler.

15. Method as claimed in claim 1, wherein the rubber polymer of the first moulded article is substantially fully vulcanized.

* * * * *

UNITED STATES PATENT AND TRADEMARK OFFICE
CERTIFICATE OF CORRECTION

PATENT NO. : 8,470,121 B2
APPLICATION NO. : 12/528148
DATED : June 25, 2013
INVENTOR(S) : Reuvekamp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this
Eighth Day of September, 2015

Michelle K. Lee
*Director of the United States Patent and Trademark Office*